(12) United States Patent  (10) Patent No.: US 8,322,257 B2
Schaerer  (45) Date of Patent: Dec. 4, 2012

(54) INSTALLATION OF SEQUENTIAL LOADING OF BARS OF MATERIAL IN A MACHINING CENTER

(75) Inventor: Rolf Schaerer, Orvin (CH)

(73) Assignee: LNS Management SA, Orvin (CH)

( * ) Notice: Subject to any disclaimer, the term of this patent is extended or adjusted under 35 U.S.C. 154(b) by 1192 days.

(21) Appl. No.: 12/216,142

(22) Filed: Jun. 30, 2008

(65) Prior Publication Data

US 2009/0007736 A1 Jan. 8, 2009

(30) Foreign Application Priority Data

Jul. 6, 2007 (EP) .................................... 07111963

(51) Int. Cl.
*B23B 13/10* (2006.01)
(52) U.S. Cl. ................................. 82/126; 82/127; 414/14
(58) Field of Classification Search ............ 82/125–127, 82/47, 48, 102; 414/14, 18; *B23B 13/10*
See application file for complete search history.

(56) References Cited

U.S. PATENT DOCUMENTS

| | | | | |
|---|---|---|---|---|
| 4,046,036 A * | 9/1977 | Yearsley | .......................... | 82/126 |
| 4,404,878 A * | 9/1983 | Blanchard et al. | .............. | 82/127 |
| 5,890,407 A * | 4/1999 | Drei | ................................ | 82/126 |
| 5,946,993 A * | 9/1999 | Flanagan | ......................... | 82/124 |
| 6,227,084 B1 * | 5/2001 | Cucchi | ............................. | 82/126 |
| 7,159,495 B2 * | 1/2007 | Cucchi | ............................. | 82/126 |
| 2001/0003934 A1 * | 6/2001 | Gellini | ............................. | 82/124 |
| 2002/0183888 A1 | 12/2002 | Sasaki et al. | | |
| 2004/0163512 A1 * | 8/2004 | Quigley | ............................ | 83/27 |
| 2005/0230894 A1 | 10/2005 | Scharer | | |

FOREIGN PATENT DOCUMENTS

| | | |
|---|---|---|
| CH | 672 446 A5 | 11/1989 |
| EP | 0 587 248 A1 | 3/1994 |
| EP | 0 737 542 A1 | 10/1996 |
| EP | 1 291 127 A1 | 3/2003 |
| EP | 1 574 285 A1 | 9/2005 |
| JP | 2005254447 A * | 9/2005 |

* cited by examiner

*Primary Examiner* — Boyer D Ashley
*Assistant Examiner* — Sara Addisu
(74) *Attorney, Agent, or Firm* — Oliff & Berridge, PLC

(57) ABSTRACT

Installation for sequential loading of bars of material, referred to as bars, in a functional subassembly of a machine for machining these bars, the installation including an elongated element, referred to as pusher, which has a front end, and is placed under the control of a first device, the pusher including at least one first part which has the front end and a second part that is connected to the first device and these two parts.

12 Claims, 4 Drawing Sheets

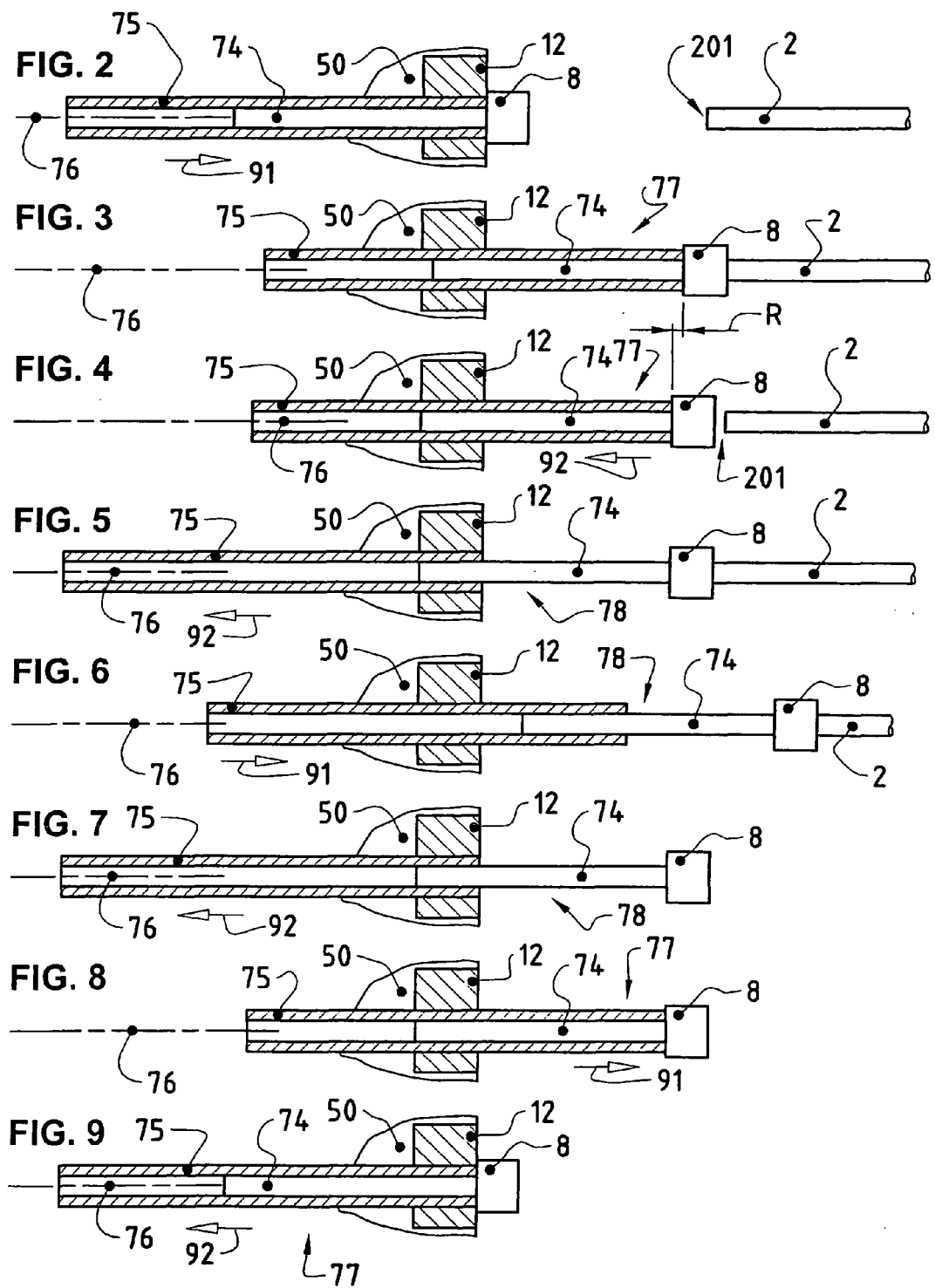

INSTALLATION OF SEQUENTIAL LOADING OF BARS OF MATERIAL IN A MACHINING CENTER

Figure 1:
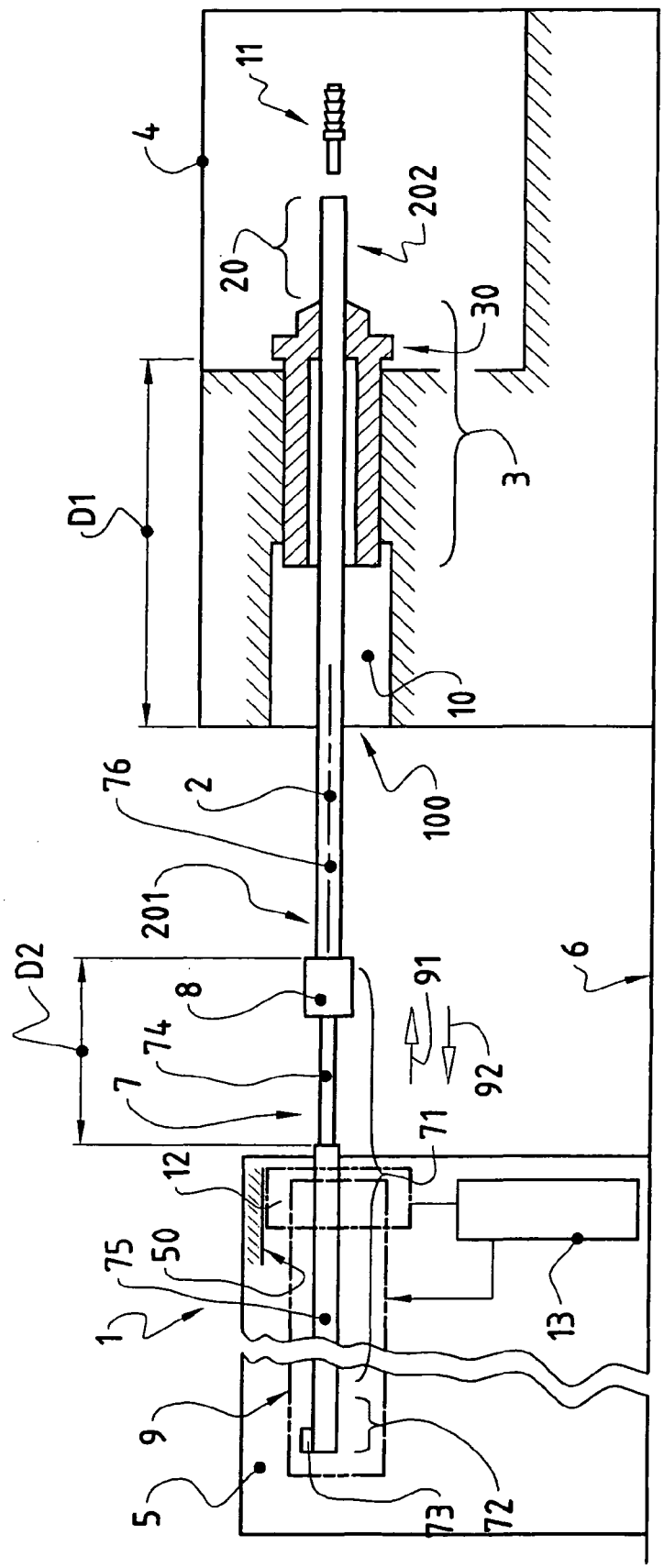

The invention relates to an installation for sequential loading of bars of material in a machine for machining of these bars.

In the field of manufacture by machine, it is known to produce pieces on automatic turning machines starting from bars of material, and this by proceeding with successive machinings of longitudinal portions of these bars.

The installations of the aforementioned type are known in this field by the name of "bar feeders", and serve to feed such automatic turning machines which are used in industrial production.

The functional subassembly which receives a bar in such a machine is a rotary subassembly of substantially tubular configuration, referred to as a spindle.

The installations of the aforementioned type comprise functional devices which make it possible to ensure different operations, which are in particular:
- an operation combining actions of support and/or of guiding a bar, in particular during its rotation, and this in the course of a translational movement of this bar along a guide axis, in particular substantially coaxial to the functional subassembly of the machine which must be traversed by said bar in order to be presented to a system of tools situated in this machine:
- an operation of storing a plurality of bars,
- an operation of selecting and withdrawing a bar,
- an operation of translational movement of the selected bar, in a way so as to bring about selectively
- the movement of this bar in such a way as to dispose it in a position referred to as ready for loading,
- the fractional pushing of the bar, in particular through the machine, from said position referred to as ready for loading until a predetermined number of pieces have been achieved,
- possibly, the extraction from the machine of a segment of bar which has not been used in this machine and the movement of said segment of unused bar, commonly referred to as "scrap", to a final position, such as a point of removal of this bar segment.

This type of installation comprises an elongated element referred to as pusher:
- has an end which, referred to as front end, is intended to exert an action on one of the opposite ends of a bar in order to be able to ensure its movement,
- is placed under the control of a device referred to as first device and capable of ensuring the translational movement of this pusher in two opposite directions, referred to as first direction and second direction, in a manner so as to move the front end and be able
- in the first direction, to bring this front end into contact with a first end of a bar, aligned beforehand with the pusher, so that at the latest after the bar has been engaged, by a second end, through the entrance of a passage that the machine has in the alignment of its spindle and up into a component of the spindle, referred to as spindle nose, and at the level of which said bar can be held tightly with a view to allowing the machining of a portion which exceeds this spindle nose,
- also in the first direction, to move sequentially the front end in such a way as to move the bar by a fraction of its length, in particular so that the products can be successively machined then taken from this bar,
- in the second direction, to extract the front end from the spindle, in a manner so as to allow a new movement of the front end in the first direction towards an end of a new bar, aligned beforehand on the front end, i.e. a new cycle of operations of loading and of movement of a bar.

Possibly, the front end of the pusher is provided with a gripping element, called a gripper, which is intended to grip around the co-operating end of the bar in order to ensure a temporary connection in translation with this bar.

Thus, when a remnant end of bar is not usable, it can be extracted from the spindle to be brought to a station, referred to as ejection station, making it possible to eject it in a manner so as to allow a new movement of the gripper in the first direction towards an end of a new bar aligned on this gripper, i.e. a new cycle of operations of loading and of movement of a bar.

On the pusher, one distinguishes between two neighboring zones, which are a first pusher zone, referred to as front zone, and intended to be engaged in the spindle, and a second pusher zone, referred to as rear zone, which is connected to the device referred to as first device.

The front zone has a length which is at least sufficient to move the front end of the pusher between the entrance to the passage aligned on the spindle and, approximately, the spindle nose.

The rear zone has a length which is at least sufficient to ensure the connection with a mechanism for maneuvering the pusher.

In general, the installation is situated closest to the machine, which makes it possible to limit the total length of the pusher and also the longitudinal dimension of the installation, this longitudinal dimension of the installation, moreover, corresponding approximately to the total length of the pusher.

The installations are thus all designed and constructed to load bars whose maximal length is predetermined, and this in machines in which the distance that separates the entrance of the passage aligned on the spindle and the spindle nose has a nominal value which is predetermined.

In order to simplify the text, the phrase "the distance which separates the entrance of the passage aligned on the spindle and the spindle nose" is replaced in the following by the phrase "loading distance."

The installations each have a certain stable range; however, i.e. they can function with different machining centers in which the nominal value for the loading distance can be contained between two predetermined limit values.

A given installation is thus foreseen to function with a certain category of machining centers all having a loading distance which is between two predetermined limit values.

These limit values define a range of tolerance for possible operation of a given installation.

The value of this range of tolerance can be about ten centimeters.

When, for a reason which will not be explained, the constructor of a given machine increases the loading distance beyond the range of tolerance for possible functioning of the installation, foreseen for this machine, the constructor of the installation has the choice of modifying the existing installation or of constructing another capable of feeding the modified machine.

One result which the invention aims to obtain is an installation of the aforementioned type that is capable of continuing to operate with a machine in which the builder increases the loading distance beyond the value of the range of operational tolerance that the installations foreseen for this machine normally have.

Another result that the invention aims to obtain resides in the simplicity of modifications to be made to an existing installation to allow it to continue to ensure its functioning in the aforementioned conditions.

These objects are achieved according to the invention through the features of the independent claim.

Figure 10:
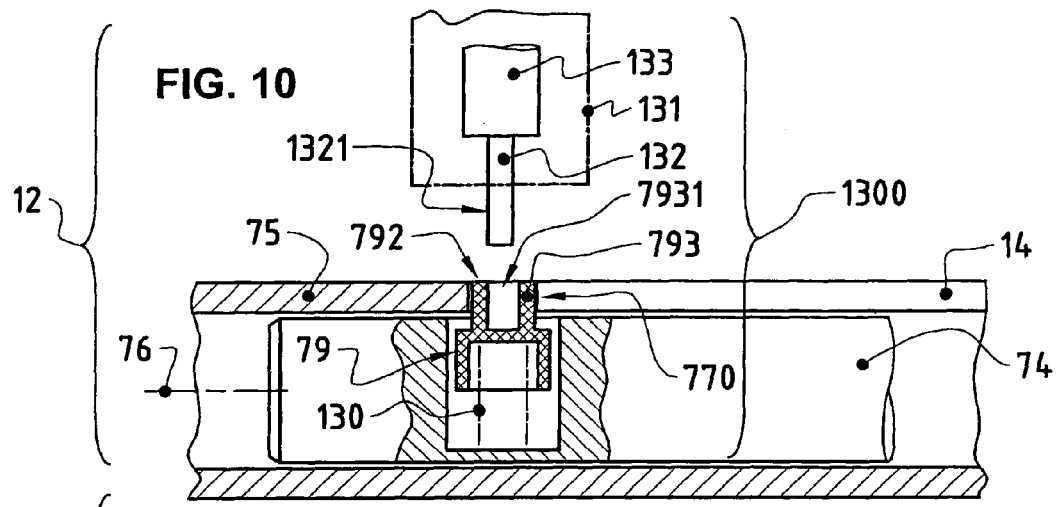
Figure 11:
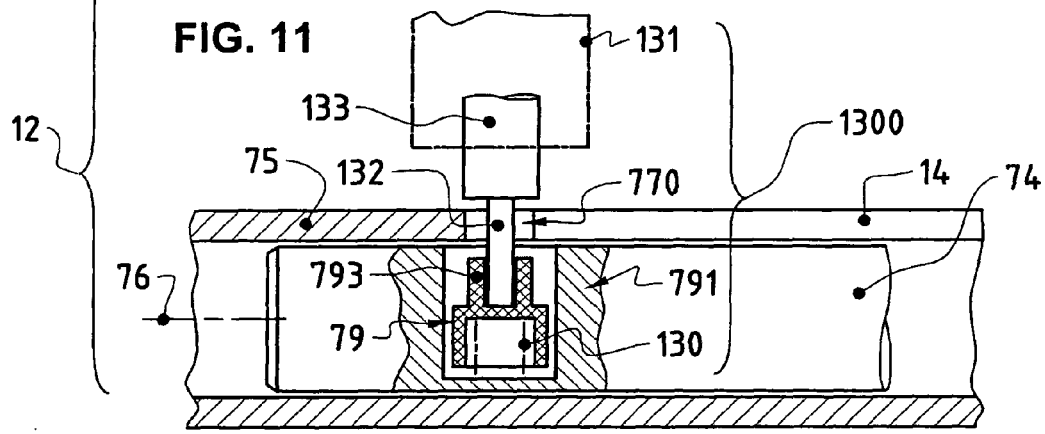
Figure 12:
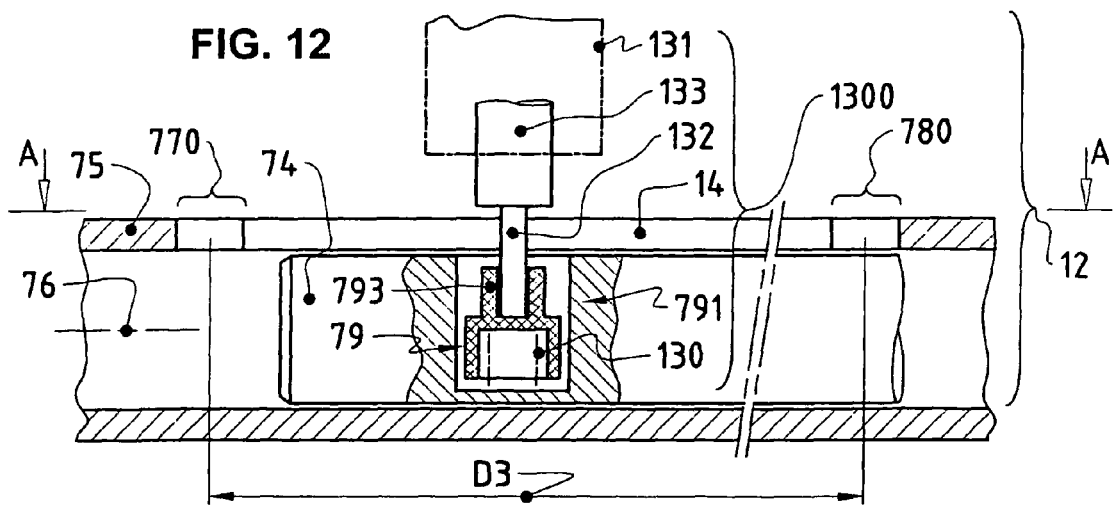
Figure 13:
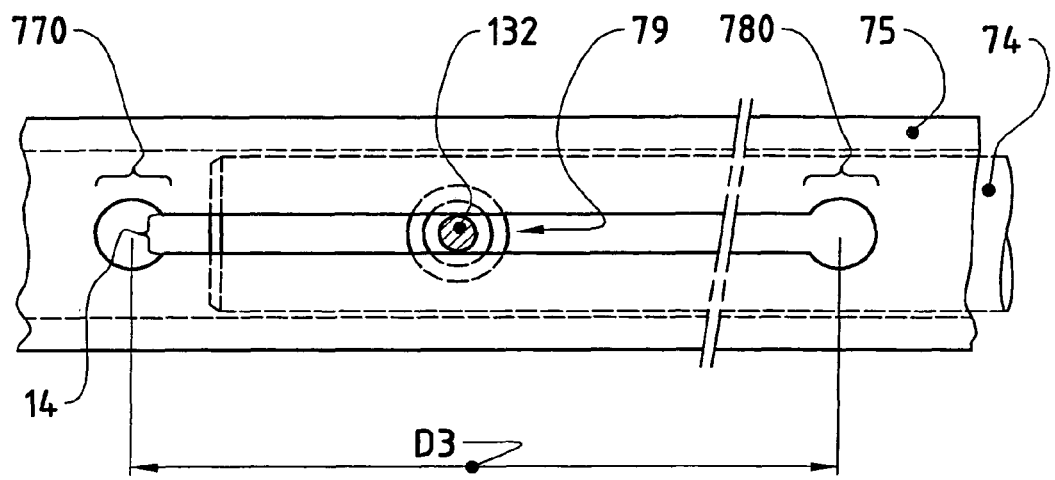

Other results will be apparent from reading the following description, given by way of non-limiting example, with reference to the attached drawing showing schematically:

FIG. 1: a lateral view of an installation according to the invention and a machine which is connected to this installation, FIGS. 2 to 9: the pusher of the installation of FIG. 1, seen laterally and locally, during the different operating phases of its functioning, FIGS. 10 to 12: the pusher of the installation of FIGS. 1 to 9, seen in local cross section and in different operational configurations, FIG. 13: a view along A of FIG. 12.

Referring to the drawing, an installation 1 can be seen for sequential loading of bars of material, referred to as bars 2, in a machine 4 for machining of these bars 2.

The machine 4 is indicated only symbolically, and will not be described in detail.

In a non-limiting way, it can be seen that the installation 1 enables the sequential bar loading 2 in a functional subassembly 3 of the machine 4.

The functional subassembly 3 is a spindle, for example.

It can be seen that the installation 1 comprises a frame 5 which, like the machine 4, is supported on a substantially horizontal surface in particular, such as the ground (symbolized by a line in FIG. 1).

Preferably, the frame 5 of the installation 1 is supported on the ground 6 by an underframe (not shown) of the type adjustable in height, with a view to adjusting the height of the installation with respect to the machine 4 and, in particular, with respect to the spindle 3 of this machine 4.

As has been indicated further above, this type of installation 1 comprises an elongated element, referred to as pusher 7, which:

has an end, referred to as front end 8, which is intended to exert an action on one of the opposite ends of a bar 2, referred to as first end 201, in order to be able to ensure the translatory movement of this bar 2, is placed under the control of a device referred to as first device 9 and capable of ensuring the translatory movement of this pusher 7 in two opposite directions, referred to as first direction 91 and second direction 92, in such a way as to move the front end 8, in the first direction 91, towards the interior of the machine 4 or, in the second direction 92, towards the interior of the installation 1 and be able in the first direction 91, bring this front end 8 into contact with the first end 201 of a bar 2, aligned beforehand with the pusher 7, and ensure a contact with this first end 201, so that at the latest after the bar 2 has been engaged by another end, referred to as second end, through the entrance 100 of a passage 10 that the machine 4 has in the alignment of its spindle 3 and up into a component of the spindle 3, referred to as spindle nose 30, and at the level of which said bar 2 can be held tightly with a view to allowing the machining of a portion 20 which exceeds this spindle nose 30, also in the first direction 91, to move sequentially the front end 8 in such a way as to move the bar 2 by a fraction of its length, in particular so that the products 11 can be successively machined then taken from this bar 2, in the second direction, to extract from the machine 4 the front end 8 of the pusher 7 in a manner so as to allow, afterwards, a new movement of the front end 8 in the first direction 91 towards a first end 201 of a new bar 2, preloaded, i.e. aligned beforehand on this front end 8 with a view to a new cycle of operations of loading and of movement of a bar 2.

Possibly the front end 8 of the pusher 7 is provided with a gripping element, called a gripper (not shown in detail), which is intended to grip around the first end 201 of the bar 2 in order to ensure a temporary connection in translation with this bar 2.

In this case, the gripper is conventionally a gripper of the type allowing a flexible coupling with the first end 201 of the bar 2.

Thus, when a remnant end of bar 2 is not usable, it can be extracted from the spindle to be brought to a station, referred to as ejection station, making it possible to eject it in a manner so as to allow a new movement of the front end 8 in the first direction 91 towards a first end 201 of a new bar 2 aligned beforehand on this front end 8, i.e. a new cycle of operations of loading and of movement of a bar 2 in the machine 4.

As has already been mentioned, in order to simplify the text, the phrase "the distance which separates the entrance 100 of the passage 10 aligned on the spindle 3 and the spindle nose 30" is replaced in the following by the phrase "loading distance D1".

On the pusher 7, one distinguishes between two neighboring zones, which are a first pusher zone 7, referred to as front zone 71, and intended to be engaged in the machine 4 and its spindle 3, and a second pusher zone 7, referred to as rear zone 72, which is connected to the first device 9.

The front zone 71 has a length, called usable length of the pusher 7, which is at least sufficient to move the front end 8 between, on the one hand, the entrance 100 of the passage 10 aligned on the spindle 3, and, on the other hand, approximately the spindle nose 30.

The rear zone 72 has a longitudinal dimension which is at least sufficient to ensure the connection with a movable element 73 of the first device 9.

In a noteworthy way:

the pusher 7 comprises at least one first part 74 which has the front end 8 and a second part 75 that is connected to the first device 9 and these two parts, referred to together as sliding parts 74, 75, are mounted sliding one in the other in such a way as to be mobile, one with respect to the other, along an axis referred to as sliding axis 76, and this between two states which are a first state which, referred to as state of contraction 77, corresponds to a state in which one 74 of said sliding parts 74, 75 is retracted in the other 75, conferring to the pusher 7 a usable length of minimal size, and a second state which, referred to as state of extension 78, corresponds to a state in which one 74 of said sliding parts 74, 75 extends partially outside the other 75, and this on a distance of extension D2 the value of which is predetermined, conferring to the pusher 7 a usable length of a maximal value.

One considers that one skilled in the art is able to select the distance of extension D2 in a way such that the pusher 7 can ensure the sought function of bar 2 loading in a machine 4 whose loading distance D1 is given, i.e. known.

It is also considered that one skilled in the art implicitly positions the installation 1 at a distance from the machine 4 which allows the features of this installation 1 to be made use of.

It is to be kept in mind that the dimension of the pusher 7 which is called "usable length of the pusher 7" corresponds to the longitudinal dimension of the front zone 71 of the pusher 7 that can be effectively used to push a bar 2 into a machine 4 and its spindle 3.

In a noteworthy way:

the sliding parts 74, 75 are placed under the control of a control device, referred to as second device 12, which makes it possible to influence the transition of the pusher 7 from its state of contraction 77 to its state of extension 78, and, reciprocally, the first device 9 and the second device 12 are placed under the control of a control device, referred to as third device 13, which allows at least at the start of one of the two operations which are, on the one hand, the operation of loading of the bar 2 into the machine 4 and, on the other hand, and operation of movement of the bar 2 in said machine 4 by a value, referred to as first value, necessary to achieve a product 11, taking into account the effective length of this bar 2 during the operation under consideration and of verification by calculation of whether the usable length of the pusher 7 under consideration in state of contraction 77 is sufficient to ensure at least one of the two operations consisting of moving the bar 2 to bring its second end 202 substantially up into the spindle nose 30, and moving the bar 2 by a fraction of its length which corresponds to the value necessary to achieve a product 11, and if the usable length of the pusher in state of contraction 77 is of a sufficient value, then maintaining such a state of contraction 77 and, on the contrary, if the usable length is insufficient, then activating the relative translation of the sliding parts 74, 75 of the pusher 7 to obtain the state of extension 78 of this pusher 7.

Conventionally, the installation 1 includes a fine control assembly for the different operational devices that it comprises, and, preferably, the third device 13 is made up of this fine control assembly.

The phrase "move the bar 2 to brings its second end 202 substantially up into the spindle nose 30", means that the second end 202 is sufficiently engaged in the spindle nose 30 to allow the creation of a product 11, i.e. the machining of such a product 11.

These technical features allow the essential result aimed for by the invention to be obtained, i.e. an installation 1 of the aforementioned type which, through its construction, can be adapted to function with a machine 4 with which it was initially compatible, but whose loading distance D1 has been increased beyond a range of tolerance for possible operation of an installation initially foreseen for this machine 4.

Designated by the phrase "makes it possible to influence the transition of the pusher 7 from its state of contraction 77 to its state of extension 78 and, reciprocally, is an operation consisting of:

at least allowing the passage from the state of contraction 77 to the state of extension 78 and vice-versa, at most to ensure the passage from the state of contraction 77 to the state of extension 78 and vice-versa.

In a noteworthy way:

the installation 1 is equipped with a functional means, on the one hand, of measuring the length of each bar 2 which has to be moved by the pusher 7, and, on the other hand, of producing a signal reflecting the measured length of this bar 2, and the third device 13 is itself designed in a manner to use the signal reflecting the measured length of a bar 2 to be loaded in the machine 4, and this, to calculate the effective length of this bar 2 depending upon the number of products 11 taken from said bar 2, to use a piece of information reflecting the value of the distance which separates the entrance 100 of the passage 10 aligned on the spindle 3 and the spindle nose 30, i.e. the value of the loading distance D1, to use a piece of information reflecting the value of the usable length of the pusher 7 during a given operation, i.e. the maximal value or the minimal value according to which the pusher is in state of extension 78 or in state of contraction 77.

The data reflecting, on the one hand, the value of the loading distance D1, and, on the other hand, the maximal and minimal values of the usable length of the pusher 7 are put in a memory.

Although this does not appear in the figures, it is the third device 13 which controls the first device 9 and the second device 12 in a way such that they ensure an operational phase of loading of a bar 2, i.e. an operational phase consisting of placing a bar 2 with its first end 201 in the alignment of the pusher 7 vis-à-vis the front end 8 of the pusher 7 (state shown in FIG. 2).

In a noteworthy way, the second device 12 makes it possible to influence the transition of the pusher 7 from one of its two states called state of contraction 77 and state of extension 78 by preventing or by allowing the relative translation of these sliding parts 74, 75 under the effect of outside actions that tend to bring about relative displacements of said sliding parts 74, 75.

These technical features make it possible to envisage a functioning without having to resort to a motor element for this purpose.

In a noteworthy way, to enable the pusher 7 to adopt the state of extension 78, the first device 9 and the second device 12 are placed under the control of a control device, referred to as third device 13, which allows them to be controlled such that they ensure at least one of the following operational phases:

a first operational phase in the course of which, on the one hand, the front end 8 being situated outside the machine 4 and, on the other hand, the second part 75 of the pusher 7 being in state of contraction 77 and fixed in this position, the pusher 7 is displaced in the first direction 91 in order to bring the front end 8 in contact with the first end 201 of the bar 2, a second operational phase in the course of which, the bar 2 is moved in the machine 4 at least until attaining a value of displacement at least equal to the distance of extension D2 of the first part 74 and of the second part 75 of the pusher 7, a third operational phase in the course of which the two sliding parts 74, 75 are released in relative translation, but the first part 74 of the pusher 7 is fixed in translation relative to a support 50 which is fixed with respect to the pusher 7, a fourth operational phase in the course of which the displacement of the pusher 7 is ordered in the second direction 92 in order to bring about a relative displacement of the sliding parts 74, 75 until their state of extension 78, a fifth operational phase in the course of which, the sliding parts 74, 75 being placed in state of extension 78, these sliding parts 74, 75 are fixed in relative translation, a sixth operational phase in the course of which the pusher 7 is displaced in such a way as to resume supply of the machine 4.

In a notable way, the third device 13 makes it possible to control the first device 9 and the second device 12 in such a way that at least one of the operations consisting of

- to displace the bar 2 to bring its second end 202 substantially up into the spindle nose 30, and
- to displace the bar 2 by a fraction of its length which corresponds to the necessary value to achieve a product 11, is followed by an operation consisting of displacing the pusher 7 in the second direction 92 by a predetermined value R at least sufficient to prevent the contact between the first end 201 of the bar 2 and the front end 8 of the pusher 7.

These technical features make it possible to eliminate any possible axial stresses triggered in the bar 2 during its displacement.

The support 50 is preferably a subassembly integral with the frame 5 of the installation 1.

The technical features mentioned above allow construction of an installation 1 of the aforementioned type which can be adapted for loading a bar 2 into a machine 4 with which it was initially compatible, but whose loading distance D1 has been increased beyond a range of tolerance (not represented) for possible functioning of an installation 1 initially foreseen for this machine 4.

The distance of extension D2 is selected to be greater than the value of the increase in the loading distance D1.

As has already been mentioned, the installation 1 includes an assembly for fine control of the different functional devices that it comprises, and, the third device 13 is preferably made up of this fine control assembly.

In a notable way, the third device 13 controls the first device 9 and the second device 12 in such a way that they ensure at least the following operational phases:

- a seventh operational phase in the course of which the pusher 7 is moved in the second direction 92 with a view to extracting the front end 8 from the machine 4,
- an eighth operational phase in the course of which the sliding parts 74, 75 are released in relative translation, but the first part 74 of the pusher 7 is fixed with respect to the support 50,
- a ninth operational phase in the course of which the displacement of the pusher 7 is controlled in the first direction 91 in order to bring about, on the one hand, a relative displacement of the sliding parts 74, 75 until their state of contraction 77 and, on the other hand, the relative immobilization of these sliding parts 74, 75 in this state of contraction 77,
- a tenth operational phase in the course of which the pusher 7 is moved in the second direction 92 in such a way as to be repositioned in a position permitting a new cycle of loading of a bar 2 in the machine 4, i.e. the position from which it is moved in the course of the first operational phase.

Through this the sliding parts 74, 75 of the pusher 7 can be displaced, one in relation to the other, in the two opposite directions which are the first direction 91 and the second direction 92, between the position of extension and the position of contraction, without a special motor element being provided to displace them, such as a pneumatic or other jack.

The third device 13 controls the first device 9 and the second device 12 in such a way that they ensure at least an eleventh operational phase which is situated between the seventh operational phase and the tenth operational phase, and according to which the front end 8, which bears a gripper, is placed at a station referred to as ejection station (not shown) at the level of which the unusable remnant end of bar 2 can be extracted from said gripper.

This makes it possible to preserve the conventional operation of the installation 1.

The third device 13 controls the first device 9 and the second device 12 in such a way as to fix, during the third operational phase, the first part 74 of the pusher 7 with respect to the support 50.

The third device 13 controls the first device 9 and the second device 12 in such a way as to fix, during the eighth operational phase, the first part 74 of the pusher 7 with respect to the support 50 and release the two sliding parts 74, 75 in relative translation.

According to an embodiment of the second device 12:

- one of the sliding parts 74, 75 bears at least two stops, referred to together as stops exercising a function of stop in translation along the sliding axis 76, and these stops, one called contraction stop 770 and the other extension stop 780, are disposed with a certain spacing apart D3 to define each one, or respectively the contraction state 77 and the extension state 78,
- the other sliding part is equipped with an element, referred to as immobilization element 79, intended to co-operate selectively with the contraction stop 770 and the extension stop 780 in such a way as to fix the two sliding parts 74, 75, one with respect to the other,
- the immobilization element 79 is
- retractable between a first position 791 in which it permits the relative sliding of the two sliding parts 74, 75 and a second position 792 in which it can co-operate, through a male part, referred to as first male part 793, with one of the two stops which are the contraction stop 770 and the extension stop 780, and thus impede the relative sliding of said sliding parts 74, 75,
- connected to an actuation means 1300 between, on the one hand, the second position 792 in which it co-operates with one of the two stops, which are the contraction stop 770 and the extension stop 780, to thus impede the relative sliding of the sliding parts 74, 75 and, on the other hand, the first position 791 where it is released from any one of said stops to thus allow the sliding of the two sliding parts 74, 75.

These technical features make it possible to ensure the perfect immobilization in relative translation of the sliding parts of the pusher, or, on the contrary, to ensure that they are effectively free in relative translation.

According to a preferred embodiment:

- the sliding parts 74, 75, i.e. the first part 74 and the second part 75 are made up at least partially hollow pieces, the first part 74 being mounted sliding in the second part 75,
- the second part 75 bears the two stops which are the contraction stop 770 and the extension stop 780, and each of these two stops is made up of the lateral face of a perforation made in the wall of said second part 75 in such a way as to constitute a stop in translation along the sliding axis 76,
- the first part 74 accommodates internally the immobilization element 79 in a way such that this immobilization element 79 is mobile in a plane radial to the sliding axis 76, and this between the two positions referred to is as first position 791 and second position 792, which are
- a first position 791 in which it does not co-operate with either of the two stops, which are the contraction stop 770 and the extension stop 780, and thus allows the relative sliding of the two sliding parts 74, 75, and
- a second position 792 in which it co-operates with one of the two stops and thus impedes the relative sliding of said first part 74 and second part 75, the actuation means 1300 comprises, on the one hand, an elastic element 130, which pulls the immobilization element 79 toward its second position 792, and, on the other hand, an actuation device 131, which is controlled to displace the immobilization element 79 in its first position 791.

The elastic element 130 preferably consists of a spring.

These features make it possible to easily adapt an existing pusher.

The actuation device 131 is borne by the support 50 and comprises:

on the one hand, an element which, referred to as actuation element 132, is disposed to act upon the immobilization element 79 through at least one of the perforations of the wall of the second part 75 and displace this immobilization element 79 from its second position 792 toward its first position 791, on the other hand, another element, which is called motor element 133, is of controlled type and is connected to the actuation element 132 in order to be able to displace it in a way such that, on the one hand, it pushes the immobilization element 79 from its second position 792 towards its first position 791, and, on the other hand, it allows the opposite movement of this immobilization element 79 under the effect of the elastic element 130 that pulls it.

The actuation element preferably consists of a jack.

The two perforations which are made in the wall of the second part 75 of the pusher 7 to form the two stops, which are the contraction stop 770 and the extension stop 780, are connected by a groove 14, and this groove 14, on the one hand, is aligned along the sliding axis 76, and, on the other hand, has a transverse dimension adapted to that of a male part, referred to as second male part 1321, which is borne by the actuation element 132 of the immobilization element 79 in a way such that, when it actuates the immobilization element 79 in its first position 791, said second male part 1321 co-operates, on the one hand, with a female bearing area 7931 provided axially in the first male part 793 of the immobilization element 79 and, on the other hand, with the groove, and by this ensures, at one and the same time:

the immobilization in translation of the first part 74 with respect to the fixed support 50, and the relative alignment of the first part 74 and of the second part 75 about the sliding axis 76, and this, at least between the contraction state 77 and the extension state 78 of the two sliding parts 74, 75.

The invention claimed is:

1. An installation for sequential loading of bars of material in a spindle of a machine for machining the bars, the installation comprising an elongated pusher, wherein the pusher has a front end, which is intended to move a first end of the bar, in order to be able to ensure translatory movement of the bar, is placed under the control of a first device and capable of ensuring the translatory movement of the pusher in a first direction and a second direction opposite the first direction in such a way as to move the front end, in the first direction, towards the interior of the machine or, in the second direction, towards the interior of the installation and in the first direction, bring the front end into contact with the first end of the bar, aligned beforehand with the pusher and ensure a contact with the first end, so that at the latest after the bar has been engaged by a second end through the entrance of a passage that the machine has in the alignment of the spindle and up into a spindle nose of the spindle and at the level of which said bar can be held tightly with a view to allowing the machining of a portion which exceeds the spindle nose, also in the first direction, to move sequentially the front end in such a way as to move the bar by a fraction of its length so that the products can be successively machined then taken from the bar, in the second direction, to extract from the machine the front end of the pusher in a manner so as to allow, afterwards, a new movement of the front end in the first direction towards a first end of a new bar, preloaded, with a view to a new cycle of operations of loading and of movement of the new bar, the pusher comprising at least one first part which has the front end and a second part that is connected to the first device and these two parts, referred to together as sliding parts, are mounted sliding one in the other in such a way as to be mobile, one with respect to the other, along a sliding axis, and this between two states which are a first state which, referred to as a state of contraction, corresponds to a state in which one of said sliding parts is retracted in the other, conferring to the pusher a usable length for moving the front end between the entrance of the passage aligned on the spindle and the spindle nose, which is of minimal size, and a second state which, referred to as state of extension, corresponds to a state in which one of said sliding parts extends partially outside the other, and this over a distance of extension the value of which is predetermined, conferring to the pusher a usable length of a maximal value, this installation, wherein:

the sliding parts are placed under the control of a second device, which makes it possible to influence the transition of the pusher from the state of contraction to the state of extension, and, reciprocally, the first device and the second device are placed under the control of a third device, which allows at least at the start of one of the two operations which are, on the one hand, the operation of loading of the bar into the machine and, on the other hand, and operation of movement of the bar in said machine by a first value necessary to achieve a product, taking into account the effective length of the bar during the operation under consideration and of verification by calculation of whether the usable length of the pusher under consideration in the state of contraction is sufficient to ensure at least one of the two operations consisting of moving the bar to bring the second end substantially up into the spindle nose, and moving the bar by a fraction of its length which corresponds to the value necessary to achieve a product, and if the usable length of the pusher in the state of contraction is of a sufficient value, then maintaining such a state of contraction and, on the contrary, if the usable length is insufficient, then activating the relative translation of the sliding parts of the pusher to obtain the state of extension of the pusher, one of the sliding parts bears at least two stops for exercising a function of stopping in translation along the sliding axis, and these stops, one called a contraction stop and the other an extension stop, are disposed with a certain spacing apart to define each one, or respectively the contraction state and the extension state, the other sliding part is equipped with an immobilization element intended to co-operate selectively with the contraction stop and the extension stop in such a way as to fix the two sliding parts, one with respect to the other, the immobilization element is retractable between a first position in which the immobilization element permits the relative sliding of the two sliding parts and a second position in which the immobilization element can co-operate, through a first male part, with one of the two stops which are the contraction stop and the extension stop and thus impede the relative sliding of said sliding parts, and connected to an actuation means between, on the one hand, the second position in which the immobilization element co-operates with one of the two stops, which are the contraction stop and the extension stop, to thus impede the relative sliding of the sliding parts and, on the other hand, the first position where the immobilization element is released from any one of said stops to thus allow the sliding of the two sliding parts.

2. The installation according to claim 1, wherein:
on the one hand, the installation is equipped with a functional means, on the one hand, of measuring the length of each bar which has to be moved by the pusher, and, on the other hand, of producing a signal reflecting the measured length of this bar, and on the other hand, the third device is itself designed in a manner to use the signal reflecting the measured length of a bar to be loaded in the machine, and this, to calculate the effective length of the bar depending upon the number of products taken from said bar, to use a piece of information reflecting the value of the distance which separates the entrance of the passage aligned on the spindle and the spindle nose, and to use a piece of information reflecting the value of the usable length of the pusher during a given operation.

3. The installation according to claim 1, wherein the second device makes it possible to influence the transition of the pusher from one of the state of contraction and the state of extension by impeding or allowing the relative translation of the sliding parts under the effect of external actions which tend to bring about relative displacements of the sliding parts.

4. The installation according to claim 1, wherein to allow the pusher to adopt the extension state, the first device and the second device are placed under the control of the third device, which makes it possible to control them in such a way that they ensure at least the following operational phases:

a first operational phase in the course of which, on the one hand, the front end being situated outside the machine and, on the other hand, the second part of the pusher being in state of contraction and fixed in this position, the pusher is displaced in the first direction in order to bring the front end in contact with the first end of the bar, a second operational phase in the course of which the bar is moved in the machine at least until attaining a value of displacement at least equal to the distance of extension of the first part and of the second part of the pusher, a third operational phase in the course of which the two sliding parts are released in relative translation, but the first part of the pusher is fixed in translation relative to a support which is fixed with respect to the pusher, a fourth operational phase in the course of which the displacement of the pusher is ordered in the second direction in order to bring about a relative displacement of the sliding parts until their state of extension, a fifth operational phase in the course of which, the sliding parts being placed in state of extension, these sliding parts are fixed in relative translation, and a sixth operational phase in the course of which the pusher is displaced in such a way as to resume supply of the machine.

5. The installation according to claim 4, wherein the third device controls the first device and the second device in such a way that they ensure at least the following operational phases:

a seventh operational phase in the course of which the pusher is moved in the second direction with a view to extracting the front end from the machine, an eighth operational phase in the course of which the sliding parts are released in relative translation, but the first part of the pusher is fixed with respect to the support, a ninth operational phase in the course of which the displacement of the pusher is controlled in the first direction in order to bring about, on the one hand, a relative displacement of the sliding parts until their state of contraction and, on the other hand, the relative immobilization of the sliding parts in this state of contraction, and a tenth operational phase in the course of which the pusher is moved in the second direction in such a way as to be repositioned in a position permitting a new cycle of loading of a bar in the machine.

6. The installation according to claim 5, wherein the third device controls the first device and the second device in such a way that they ensure at least an eleventh operational phase which is situated between the seventh operational phase and the tenth operational phase, and according to which the front end, which bears a gripper, is placed at a station referred to as ejection station at the level of which the unusable remnant end of bar can be extracted from said gripper.

7. The installation according to claim 4, wherein the third device controls the first device and the second device in such a way as to fix, during the third operational phase, the first part of the pusher with respect to the support.

8. The installation according to claim 4, wherein the third device controls the first device and the second device in such a way as to fix, during the eighth operational phase, the first part of the pusher with respect to the support and release the two sliding parts in relative translation.

9. The installation according to claim 1, wherein the third device makes it possible to control the first device and the second device in such a way that at least one of the operations consisting of to displace the bar to bring the second end substantially up into the spindle nose, and to displace the bar by a fraction of its length which corresponds to the necessary value to achieve a product, is followed by an operation consisting of displacing the pusher in the second direction by a predetermined value at least sufficient to prevent the contact between the first end of the bar and the front end of the pusher.

10. The installations according to claim 1 wherein:
the sliding parts are made up of at least partially hollow pieces, the first part being mounted sliding in the second part, the second part bears the two stops which are the contraction stop and the extension stop, and each of these two stops is made up of the lateral face of a perforation made in the wall of said second part in such a way as to constitute a stop in translation along the sliding axis, the first part accommodates internally the immobilization element in a way such that the immobilization element is mobile in a plane radial to the sliding axis, and between two positions referred to as a first position and a second position, which are a first position in which it does not co-operate with either of the two stops which are the contraction stop and the extension stop and thus allows the relative sliding of the two sliding parts, and a second position in which it co-operates with one of the two stops and thus impedes the relative sliding of said first part and second part, the actuation means comprises, on the one hand, an elastic element which pulls the immobilization element toward the second position and, on the other hand, an actuation device which is controlled to displace the immobilization element into the first position.

11. The installation according to claim 10, wherein the actuation device comprises:

on the one hand, actuation element that is disposed to act upon the immobilization element through at least one of the perforations of the wall of the second part and displace the immobilization element from the second position toward the first position, on the other hand, a motor element that is of a controlled type and is connected to the actuation element in order to be able to displace it in a way such that, on the one hand, it pushes the immobilization element from the second position towards the first position, and, on the other hand, it allows the opposite movement of this immobilization element under the effect of the elastic element that pulls it.

12. The installation according to claim 11, wherein the two perforations which are made in the wall of the second part of the pusher to form the two stops, which are the contraction stop and the extension stop, are connected by a groove, and the groove, on the one hand, is aligned along the sliding axis, and, on the other hand, has a transverse dimension adapted to that of a second male part, which is borne by the actuation element of the immobilization element in a way such that, when it actuates the immobilization element in the first position, said second male part co-operates, on the one hand, with a female bearing area provided axially in the first male part of the immobilization element and, on the other hand, with the groove, and by this ensures, at one and the same time:

the immobilization in translation of the first part with respect to the fixed support, and the relative alignment of the first part and of the second part about the sliding axis, and this, at least between the contraction state and the extension state of the two sliding parts.

\* \* \* \* \*